United States Patent [19]

Winiasz

[11] 4,102,373

[45] Jul. 25, 1978

[54] SEMI-AUTOMATIC LOGSPLITTER

[76] Inventor: Michael Edward Winiasz, 4009 Washington Ave., Lorain, Ohio 44052

[21] Appl. No.: 796,407

[22] Filed: May 12, 1977

[51] Int. Cl.[2] .......... A47J 49/02; B27L 7/00

[52] U.S. Cl. .......... 144/193 A; 144/3 K; 144/193 E; 254/93 HP; 254/104

[58] Field of Search .......... 144/193 R, 193 A, 193 D, 144/193 E, 193 F, 193 J, 193 K, 3 K, 2 R, 304 R; 254/104, 93 HP

[56] References Cited

U.S. PATENT DOCUMENTS

| | | | |
|---|---|---|---|
| 2,851,072 | 9/1958 | Gerjefs et al. | 144/193 A |
| 3,097,676 | 7/1963 | Calk | 144/193 A |
| 3,285,304 | 11/1966 | Fuller | 144/193 A |

*Primary Examiner*—Gil Weidenfeld
*Assistant Examiner*—W. D. Bray
*Attorney, Agent, or Firm*—Bosworth, Sessions & McCoy

[57] ABSTRACT

This invention relates to a device used primarily, but not exclusively for splitting logs.

The purpose of the device is to provide a means for splitting wood into a usable dimension by expanding a bellows type membrane using a low pressure medium source under a restrained log forcing it into a set of shearing blades.

10 Claims, 9 Drawing Figures

SEMI-AUTOMATIC LOGSPLITTER

In previous practice, logs were split by either manual labor, using wedges and hand held axes, or awkward, cumbersome and expensive automatic equipment.

A feature of the present invention over the hand held wedge method is that it reduces the possibility of overexertion to those individuals not accustomed to heavy manual labor.

Another feature of this invention is that it employs a relatively large area, low operating pressure, expandable, seamless, flexible, convoluted bladder as a source of high force, which is inflated by a non-compressible media such as is available in a household water supply thus allowing the use of standard garden hose and shut-off valves for controlling activation.

Another feature of this invention is that it does not require a secondary source of power other than that described above, and is simply constructed allowing for a relatively inexpensive and easily dismantleable device.

Another feature of this invention is that the unit constructed to split a log into more than two pieces per cycle (present design indicating but not limited to four) allowing for a higher production rate at a slower, safer operating speed.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein.

Figure 2:
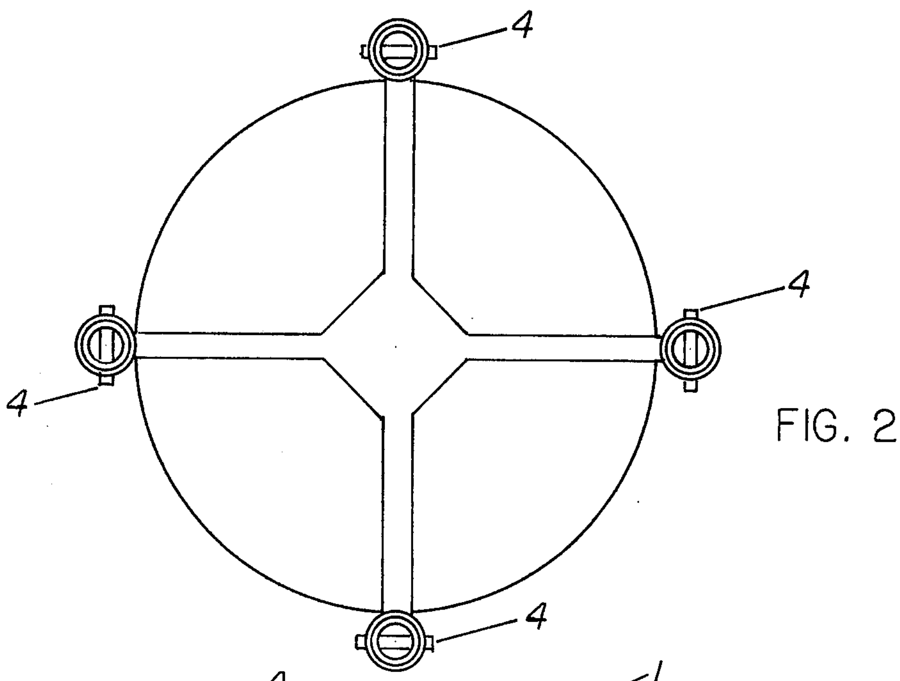
FIG. 2 is a top plan view of the preferred form of the logsplitter.

In its general form, an upper blade section 1 is connected to vertical supports 6, which are connected to base 13 and 14 with restraining plate 11 and bladder 12 resting on base section 14. Another restraining plate 11 rests on bladder 12 with intermediate stabilizer 8, 9, 10 resting on restraining plate 11. Said intermediate stabilizer is guided by vertical supports 6 and allowed to travel with the expansion and contraction of the bladder.

THE BLADE

Figure 4:
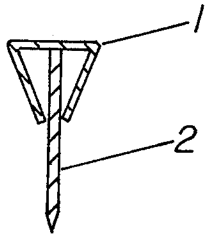
FIG. 4 is a cross-sectional view of the blade on about line 4, 4.

The blade includes knife edge 2, reinforcing deflector 1, and tubular blade collars 3. In its preferred form the blade consists of 4 radially tapered knife edges 2, extending diagonally across and intersecting at right angles to each other about the center of the device, firmly welded to the blade collars 3 and to each other at the center to form a cross pattern as shown in FIG. 2. Guide point 5 is part of knife edge 2. Reinforcing deflector 1 is firmly welded to knife edge 2 as shown in FIG. 4 and also to blade collars 3 and each other at the center.

THE BASE

Figure 1:
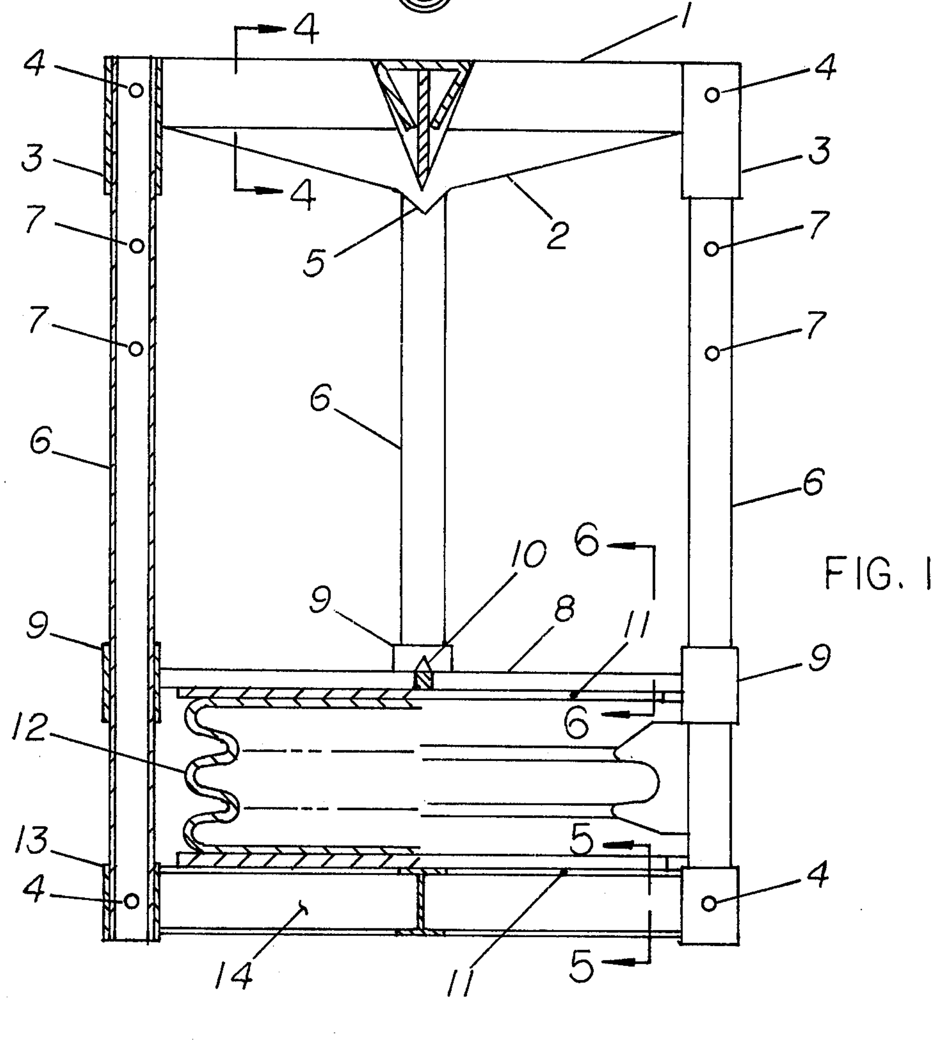
FIG. 1 is a side elevation of the preferred form of the logsplitter.
Figure 5:
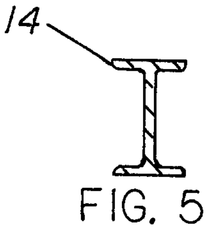
FIG. 5 is a cross-sectional view of base on about line 5, 5.

The base includes structural beams 14 and tubular base collars 13. In its preferred form the base consists of four structural beams, whose preferred shape is shown in FIG. 5, extending diagonally across the device and intersecting at right angles to each other about the center and each firmly welded to base collars 13 and to each other at the center. The base is attached to the blade by means of 4 vertical and parallel tubular supports 6 and by connecting pins 4 as shown in FIG. 1. Tubular supports 6 are of a smaller diameter than tubular blade or base collars 3, 13 and are allowed to fit concentrically within said blade or base collars. Horizontal holes are drilled through blade and base collars 3, 13 and through vertical tubular supports 6 at each end. Connecting pins 4 are inserted into concentric, aligned holes as shown in FIG. 2 to form the assembly. Multiple adjusting holes 7 are drilled into tubular supports 6 to allow the blade to be lowered or raised to accomodate various length specimens.

THE BLADDER

Figure 3:
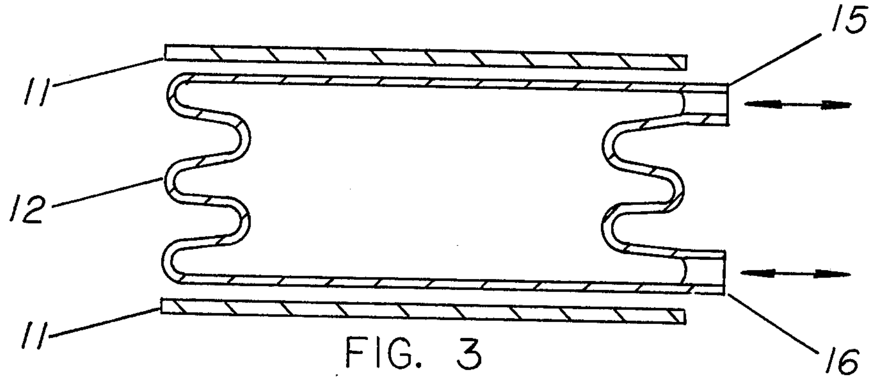
FIG. 3 is a cross-sectional view of the preferred form of the bladder and restraining plates.

The bladder 12 consists of a flexible self-contained membrane of a shape and size as to fit into the base structure of FIG. 1. Filling and/or empty ports 15 and 16 are located at the top most and bottom most convolutes as shown in FIG. 3 to allow for air purging and normal operation. In its preferred form, the shape is circular and convoluted to allow maximum expansion and contraction.

INTERMEDIATE STABILIZER

Figure 6:
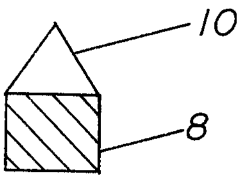
FIG. 6 is a cross-sectional view of intermediate stabilizer on about line 6, 6.

The intermediate stabilizer includes cross bars 8 whose preferred cross section is shown in FIG. 6, tubular stabilizing collars 9 and stabilizing clete 10. Four cross bars 8 extend diagonally across the device and intersect at right angles to each other about the center of the device firmly welded to the tubular stabilizing collars 9 and to each other at the center to form a cross pattern. To the top center of the cross bars, opposite the bladder a stabilizing clete 10 is firmly welded. Stabilizing collars 9 are of a larger diameter and are arranged coincident with tubular supports 6 allowing for a guided unrestrained axial sliding fit.

RESTRAINING PLATES

Restraining plates 11 are of a shape and size as to fit into the base structure above and below bladder 12 as shown in FIG. 3 and whose function is to uniformly distribute the force created by the bladder to the base and intermediate stabilizer. Stabilizer plates 11 may be attached to or seperate from bladder 12.

THE MODIFIED FORM

Figure 9:
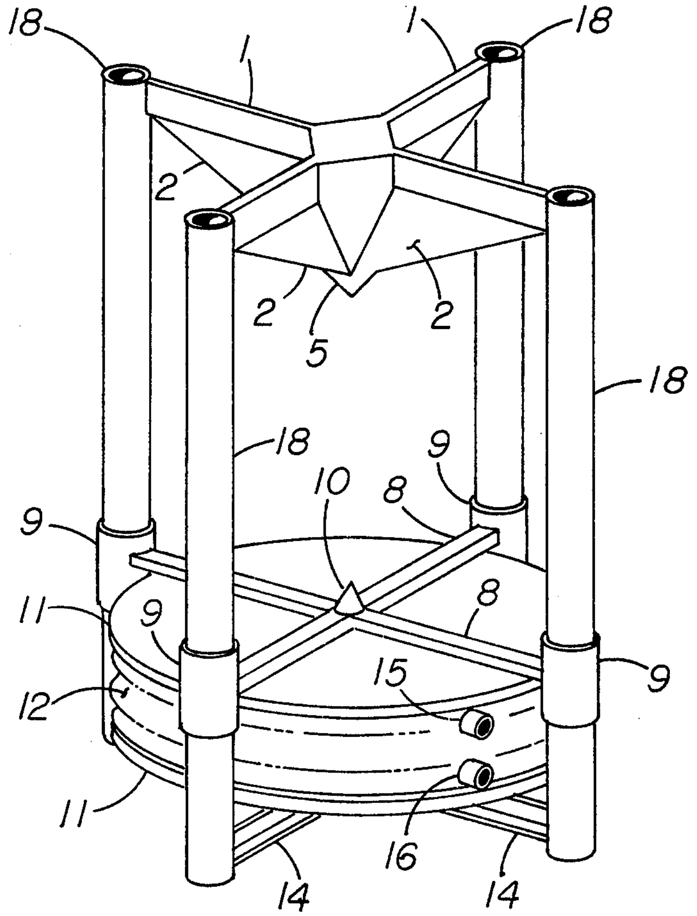
FIG. 9 is a perspective view of the modified form of the logsplitter.

The modified form of the semi-automatic logsplitter is shown in FIG. 9, and differs from the first form in the physical attachment of blade to base sections. Blade and base collars 3 and 13 along with connecting pins 4 and adjusting holes 7 are eliminated. Blade sections 1 and 2 are firmly welded to uppermost section of modified tubular supports 18 and structural base beams 14 are firmly welded to lowermost portion of modified tubular supports 18 with intermediate stabilizer located prior to welding. In this form the device is not dismantleable and restricts its portability but allows for a less expensive structure.

OPERATION

Figure 7:
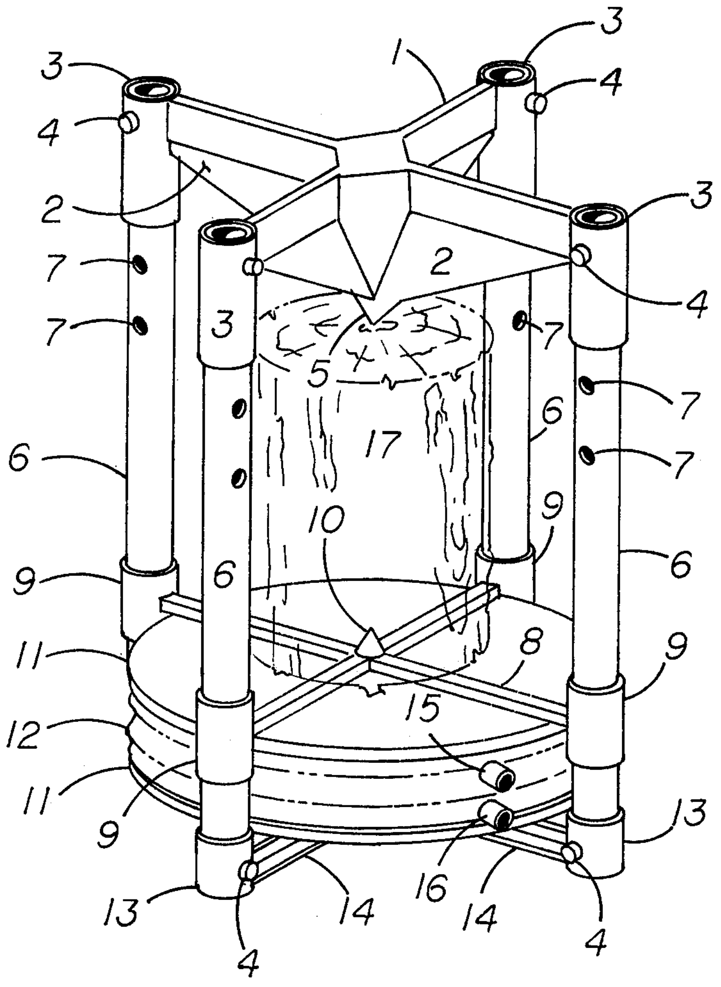
FIG. 7 is a perspective view of logsplitter at beginning of stroke.
Figure 8:
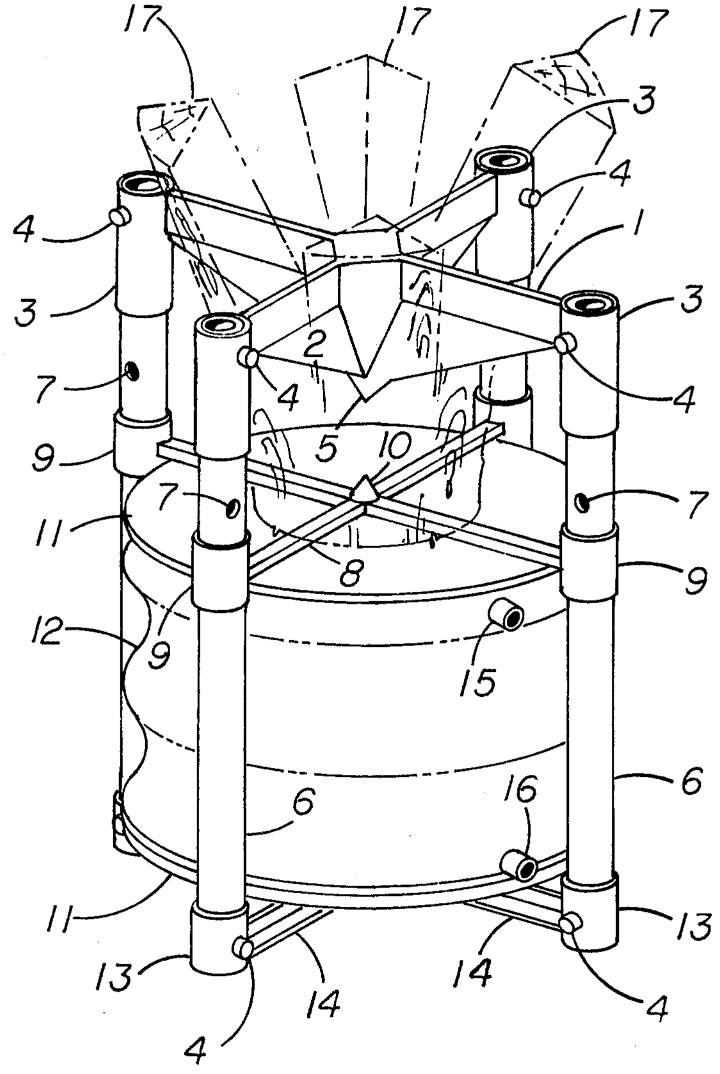
FIG. 8 is a perspective view of logsplitter at end of stroke.

In operation, the operator allows any fluid trapped in the bladder 12 to escape via ports 15 and 16 by appropriate external valving thus allowing bladder 12, intermediate stabilizer and one restraining plate to collapse as indicated in FIG. 7. Specimen log 17 is inserted and allowed to wedge between stabilizing clete 10 and guide point 5 with the grain of the wood running parallel to the vertical line connecting the tips of point 5 and clete 10. Fluid is introduced into ports 15 and 16 at a sufficient pressure to expand the bladder forcing specimen 17, resting on intermediate stabilizer 8, into tapered knife edges 2; thus fracturing the specimen from the center to the periphery into segments corresponding in number to each knife edge. After the specimen is fractured, the bladder is allowed to expand further as shown in FIG. 8, thus forcing the specimen into the deflector section 2 causing a higher rate separation of the fractured segments. Individual specimen segments 17 are removed and the operation is recycled.

I claim:

1. A semi-automatic log-splitting device comprising:
a base section;
tubular support members having opposite ends, the tubular support members being attachable to the base section;
means on the base section defining means to attach the support members of one of their respective ends to the base section in an upwardly depending relationship;
a detachable sectional splitting means disposed on the other ends of the tubular support members, the splitting means having
a stabilizing point projecting toward the base section,
tapered knife blade means depending outwardly from the stabilizing point toward the tubular support members, and
means to adjust the splitting means on the tubular support members;
deflector means attached to the knife blade means;
an axially movable intermediate stabilizing means disposed between the base section and the splitting means, the intermediate stabilizing means having a stabilizing clete for cooperation with a log placed between the intermediate stabilizing means and the splitting means and;
means for forcing the intermediate stabilizing means upwardly, whereby the log is split into sections.

2. The device of claim 1, further comprising:
restraining plate means disposed between the intermediate stabilizing means and the base section;
an expandable membrane attached to the plate means and disposed between the plate means, the membrane being of sufficient area to create a large exerted force and defining the means for forcing the intermediate stabilizing means upwardly; and
at least one filling port located on the membrane in such a manner as to allow the influx of a relatively noncompressible medium.

3. The device of claim 2, wherein the membrane is comprised of convoluted sections, whereby upon introduction of the noncompressible medium, the membrane undergoes a unidirectional displacement of sufficient magnitude to force the log into the splitting means.

4. The device of claim 1, wherein the means for forcing the intermediate stabilizing means upwardly comprises a self-contained, expandable membrane.

5. The device of claim 4 wherein the membrane is comprised of convoluted sections.

6. A semi-automatic log-splitting device comprising:
a base section;
tubular support members having opposite ends, the support members being fixedly attached at their respective ends to the base section and depending upwardly from the base section;
a sectional splitting means fixedly attached to the support members at their other ends, the splitting means having a stabilizing point projecting toward the base section and having tapered knife blade means depending outwardly from the stabilizing point toward the support members;
deflector means attached to the knife blade means;
a movable intermediate stabilizer disposed between the splitting means and the base section, the stabilizer having a stabilizing clete for cooperation with a log placed between the stabilizer and the splitting means; and
means for forcing the stabilizer upwardly, whereby the log is split into sections.

7. The device of claim 6, further comprising:
restraining plate means disposed between the intermediate stabilizer and the base section;
an expandable membrane attached to the plate means and disposed between the restraining plate means, the membrane being of sufficient area to create a large exerted force and defining the means for forcing said intermediate stabilizer upwardly; and
at least one filling port located on the membrane in such a manner as to allow the influx of a relatively noncompressible medium.

8. The device of claim 7, wherein the membrane is comprised of convoluted sections, whereby upon introduction of the noncompressible medium, the membrane undergoes a unidirectional displacement of sufficient magnitude to force the log into the splitting means.

9. The device of claim 6, wherein the means for forcing the intermediate stabilizing means upwardly comprises a self-contained, expandable membrane.

10. The device of claim 9 wherein the membrane is comprised of convoluted sections.

* * * * *